United States Patent [19]

List

[11] 3,882,384
[45] May 6, 1975

[54] ENERGY CONVERSION
[75] Inventor: William F. List, Linthicum, Md.
[73] Assignee: Westinghouse Electric Corporation, Pittsburgh, Pa.
[22] Filed: Nov. 16, 1973
[21] Appl. No.: 416,469

Related U.S. Application Data
[62] Division of Ser. No. 173,488, Aug. 20, 1971, Pat. No. 3,846,028.

[52] U.S. Cl............ 324/71 R; 307/310; 73/362 SC
[51] Int. Cl. .......................................... G01n 27/00
[58] Field of Search ........... 307/310, 311; 328/2, 3; 332/31 T; 324/71 R, 120; 356/215, 226; 250/206; 73/362 SC

[56] References Cited
UNITED STATES PATENTS
| | | | |
|---|---|---|---|
| 2,794,863 | 6/1957 | Roosbroeck | 307/311 X |
| 3,064,193 | 11/1962 | Grubb et al | 324/120 |
| 3,157,843 | 11/1964 | Koncen | 332/31 T |
| 3,486,821 | 12/1969 | Westhaver | 356/226 X |
| 3,523,740 | 8/1970 | Peter et al. | 356/215 |

Primary Examiner—Alfred E. Smith
Assistant Examiner—Rolf Hille
Attorney, Agent, or Firm—D. Schron

[57] ABSTRACT

Apparatus for measuring temperature or light intensity is disclosed. Potential pulses of variable frequency are impressed between the collector and emitter of a transistor whose base is open or floats electrically. The transistor is subjected to the condition being measured, the light to be measured impinging on the transistor while it is maintained at a constant temperature or the transistor being subjected to the temperature being measured while masked or while the light impinging thereon is maintained constant. The frequency of the pulses is varied so as to maintain the amplitude or shape of the pulses transmitted by the transistor constant and the measurement of the condition is derived from the frequency of the impressed pulses.

Apparatus is also disclosed for converting light images into electrical signals by impinging the image, by scanning along a linear array of transistors in a monolithic solid-state element or directly on a monolithic element having a two dimensional array of transistor elements thereon.

4 Claims, 14 Drawing Figures

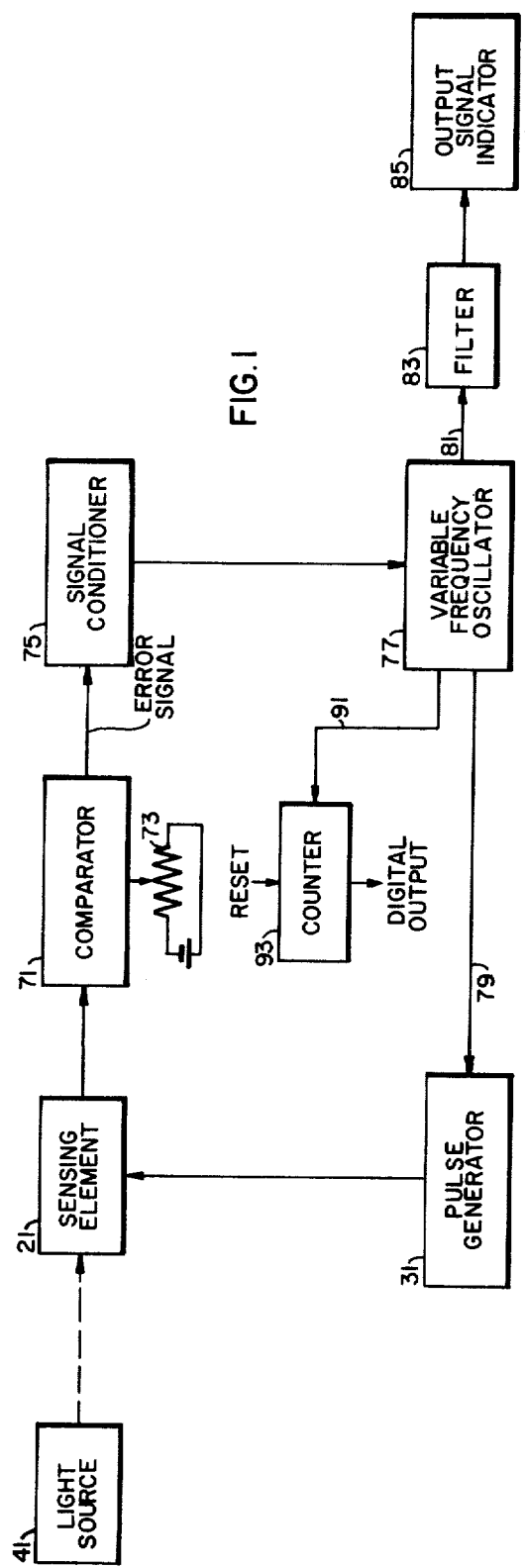
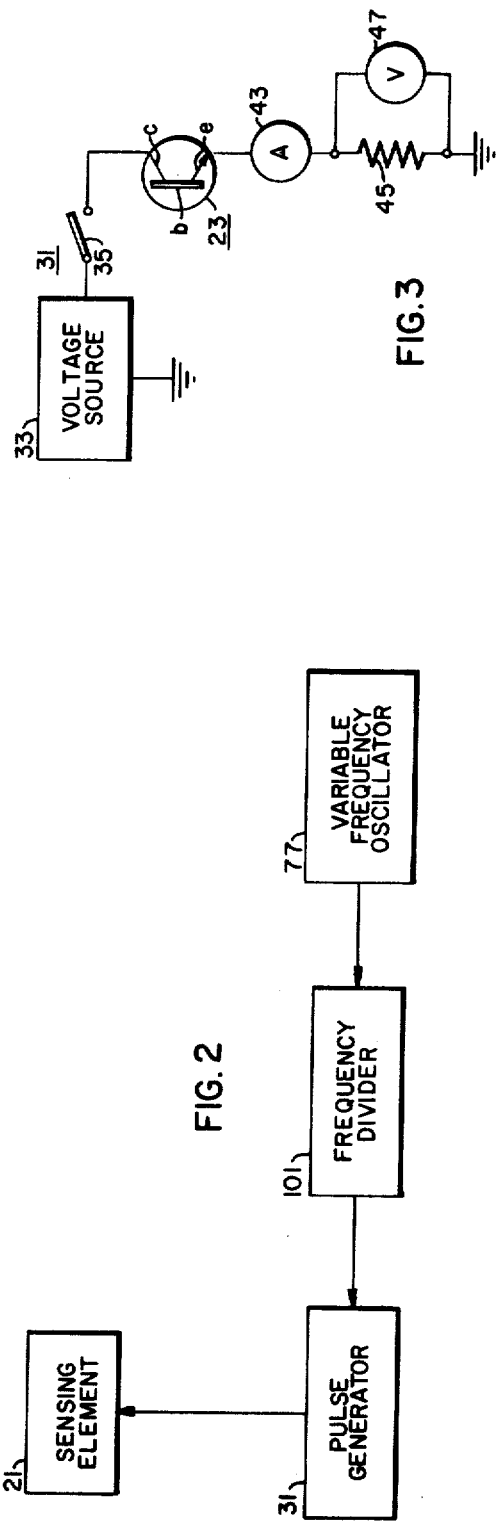

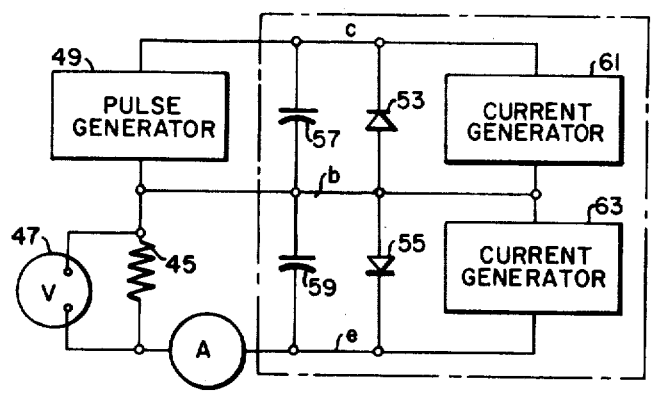
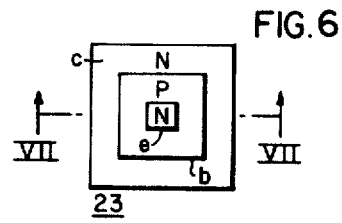
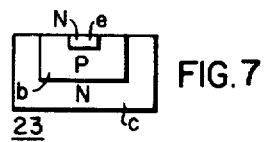
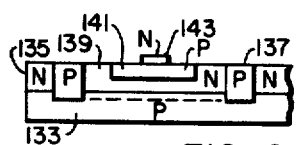
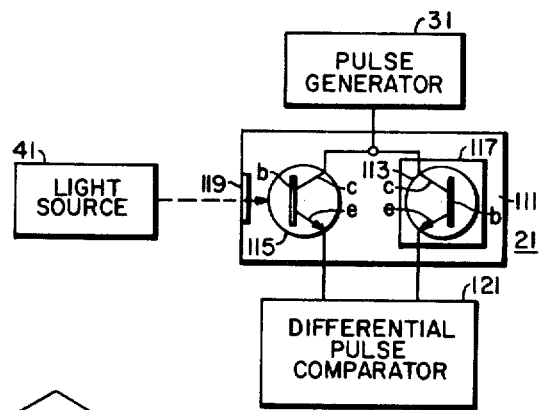
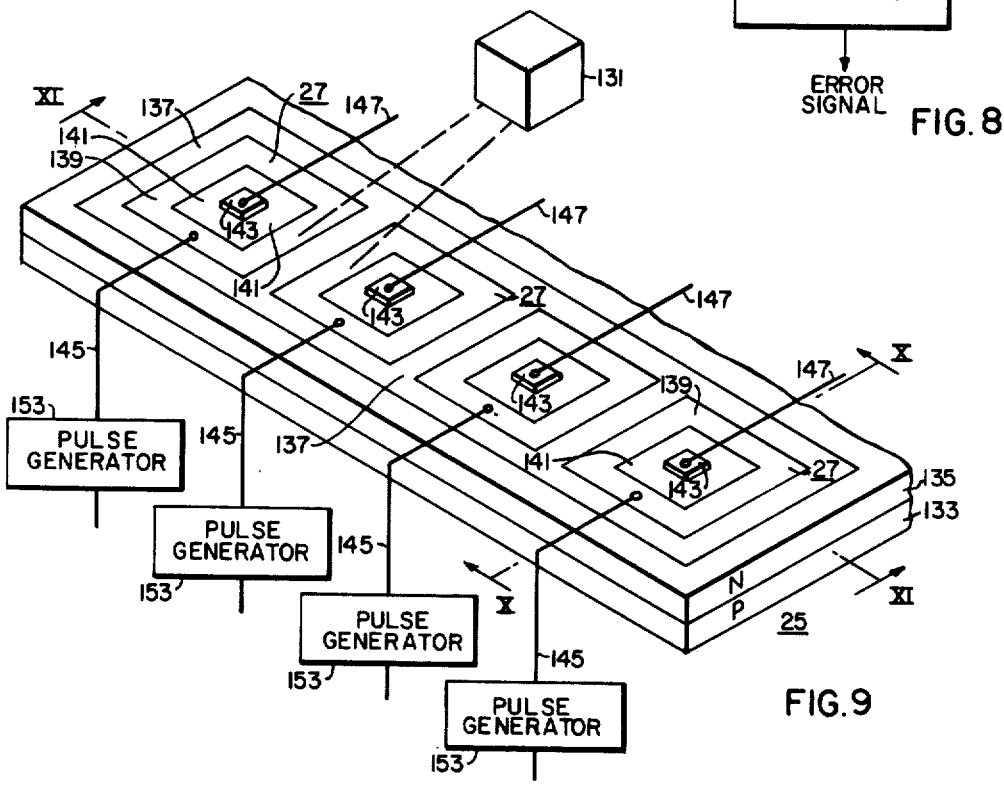

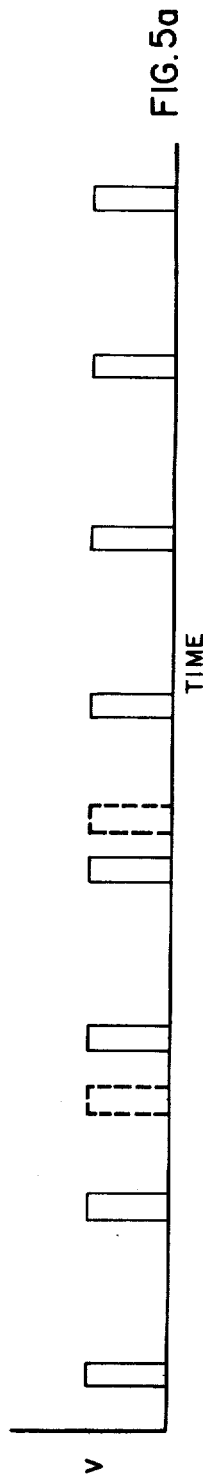
FIG.5a
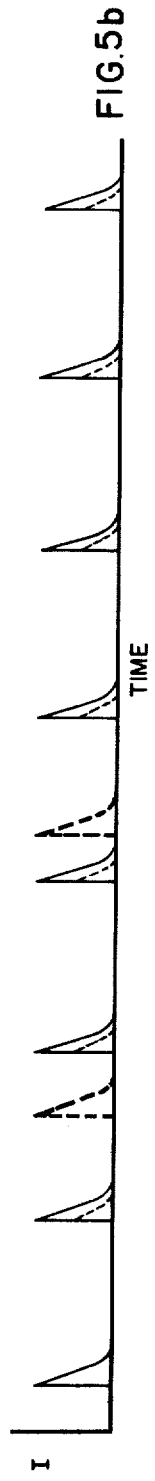
FIG.5b
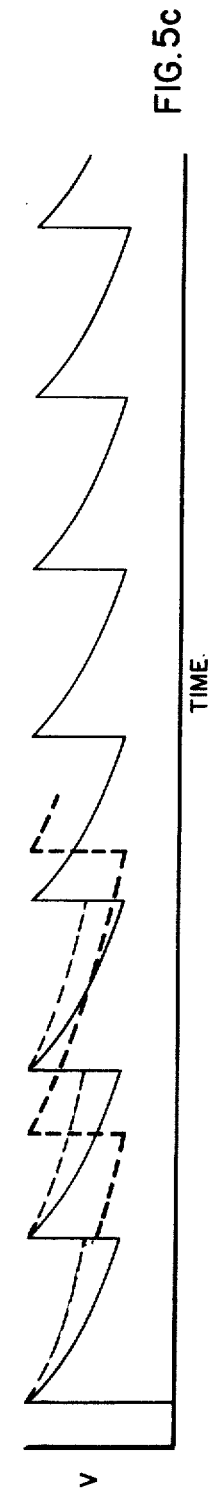
FIG.5c
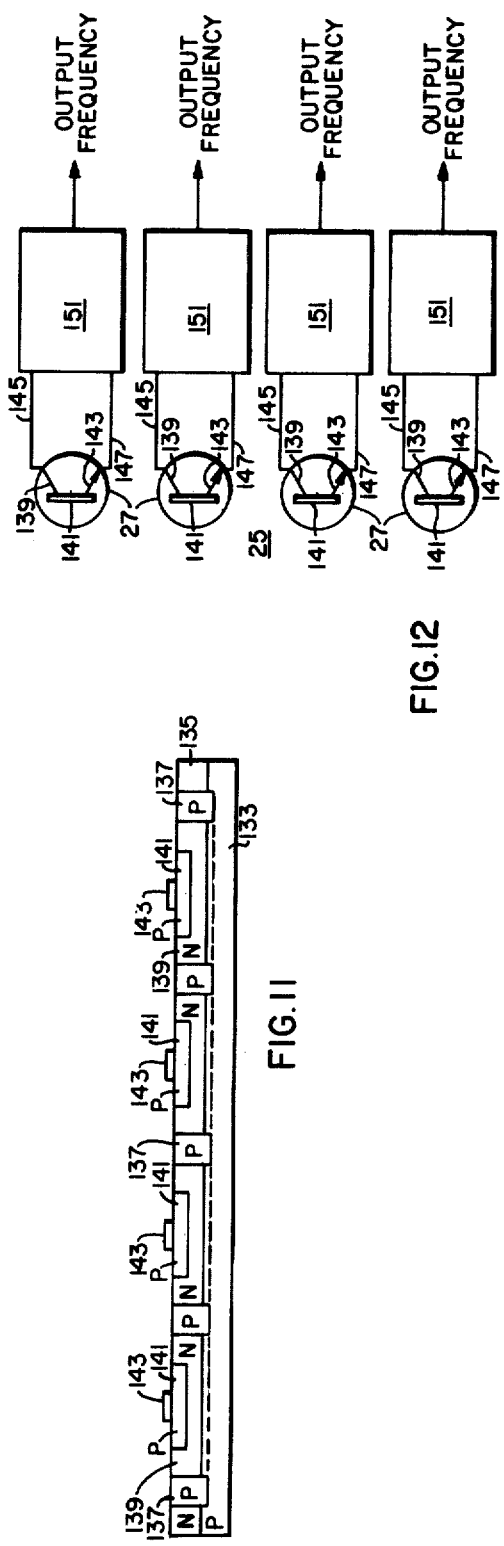
FIG.11
FIG.12

ENERGY CONVERSION

This is a division, of application Ser. No. 173,488 filed Aug. 20, 1971, now U.S. Pat. No. 3,846,028.

BACKGROUND OF THE INVENTION

This invention relates to energy conversion and has particular relationship to the conversion of other forms of energy, such as light or heat, into electricity. The invention concerns itself with the application of energy conversion phenomena of solid state devices to reliable and highly precise measurement over a wide range, of such conditions as light intensity and temperature. It is an object of this invention, by application of planar silicon technology, to create a light-or-temperature-measurement capability of wide dynamic range operable over at least four orders of magnitudes; which shall also afford the facility for the reading of data in digital form. The reference to "silicon" above is intended to include within its scope other elements such as germanium which function generally similarly to silicon in a particular application.

In accordance with the teachings of prior art, energy conversion from another form of energy to electricity for measurement purposes is achieved with sensing elements which provide a measure of the input energy in analog form, such as a change in resistance or in current or in voltage magnitude. Where the data derived from such sensing elements is to be utilized in a digital computer or telemetered over a long distance over which servere attenuation of the input signal may occur, the analog data derived as taught by the prior art must be converted into a digital measure. In addition it has been found that the prior art techniques are inherently limited in dynamic range by the parameters monitored.

It is an object of this invention to overcome the deficiencies of the prior art and to provide measurement apparatus for measuring such conditions as light intensity or temperature by conversion into electricity of the energy of which these conditions are a manifestation, which apparatus shall provide directly a digital measure of these conditions and shall operate over a wide dynamic range.

SUMMARY OF THE INVENTION

This invention arises from the observation that if the collector circuit of a silicon planar transistor connected in an open-base configuration is pulsed while the surface of the transistor is exposed to light, that the output pulse amplitude and shape (area under the pulse defined as a function of time or the time integral of the magnitude of the pulse) is a function of the number of photons incident upon the transistor in the period between pulses and during the pulses. The expression "open-base configuration" means that the base is connected only to the collector and emitter through leakage resistance and is not connected to any external circuit. The base may be regarded as floating electrically. The above-described phenomenon arises from the changes in this leakage resistance which occur as the light intensity to which the transistor is exposed changes. For a wide range of incident light levels and for pulses of duration that are short compared to the interval between pulses, contribution of photons incident during a pulse is a negligibly small percentage of the output signal as compared to the contribution of photons incident during the interval between pulses because of an integration effect which essentially sums the total number of photons incident during this period and reads them out as a burst. The readout or output pulse amplitude or shape can be controlled by varying the rate at which read pulses are applied, as well as by varying the external load conditions placed upon the photons sensing element. This invention also arises from the observation that in the absence of incident photons, or for constant incident photons per unit time, if the "integration period" is made suitably long, compared to the pulse duration, the output pulse observed is a function of the leakage current of the transistor base collector junction, which is a sensitive measure of junction temperature.

In accordance with the invention, measurement apparatus is provided including a light-responsive solid-state device, typically a silicon transistor. The transistor is connected in open base configuration with a periodic potential of variable frequency impressed between its collector and emitter. The periodic potential is, in the usual practice of this invention, a pulsating potential consisting of pulses at intervals, the duration of the pulses being short compared to the duration of the intervals. Typically, the duration of the pulses may be about 1 percent of the duration of the intervals. The transistor is also subject to the condition to be measured. Where light intensity of a source is to be measured, the transistor is exposed to the light while being maintained at a constant temperature. Where temperature is to be measured, the transistor is maintained at the temperature to be measured while masked or exposed to light of constant intensity. In either case the amplitude and/or the shape (area) of the pulses resulting from the impressing of the periodic potential is maintained constant by changing the frequency of the periodic potential impressed. The resulting frequency is then a digital measure of the condition under observation. This frequency may be readily varied over a wide range, at least 10,000 to 1, so that the dynamic range of the measurement is wide.

The invention may be practiced with a plurality of transistors with certain of the transitors serving for temperature compensation. The several transistors may be components of a monolithic element to facilitate matching of transistor properties of the several transistors.

In accordance with this invention, a monolithic element having an array of transistor connected in open-base configuration as described above may provide digital or frequency readout for line-scanning imaging utilizing light integration as disclosed to provide wide dynamic range imaging. Such a monolithic element having a two-dimensional array of transistors can also be used to provide digital or frequency readout small order mosaic imaging utilizing light integration to provide two-dimensional imaging.

BRIEF DESCRIPTION OF THE DRAWING

For a better understanding of this invention, both as to its organization and as to its method of operation, together with additional objects and advantages thereof, reference is made to the following description taken in connection with the accompanying drawings, in which:

FIG. 1 is a block diagram showing an embodiment of this invention;

FIG. 2 is a block diagram showing a modification of this invention;

FIG. 3 is a schematic illustrating the operation of the sensing components of the apparatus shown in FIGS. 1 and 2;

FIG. 4 is a diagram presenting an electrical circuit equivalent to the schematic shown in FIG. 3 to aid in the understanding of this invention;

FIGS. 5a, 5b, and 5c are graphs relating to FIG. 4 and serving to aid in the understanding of this invention;

FIG. 6 is a diagrammatic plan view of the transistor used in the practice of this invention presented to aid in the understanding of this invention;

FIG. 7 is a view in section taken along line VII—VII of FIG. 6;

FIG. 8 is a diagrammatic view showing a modification of this invention.

FIG. 9 is a diagrammatic view in perspective showing a modification of this invention which serves for electrical imaging and in which the solid state component is a monolithic element shown enlarged;

FIG. 10 is a view in section taken along line X—X of FIG. 9 of the monolithic element shown in FIG. 9;

FIG. 11 is a view in section taken along line XI—XI of this monolithic element; and FIG. 12 is a diagrammatic view showing a circuit equivalent to FIG. 9.

DETAILED DESCRIPTION OF THE INVENTION

The apparatus shown in FIGS. 1 through 7 includes a sensing element 21 which, in the practice of this invention, is a solid state light and/or heat sensitive component such as a transistor 23 or a monolithic element 25 (FIGS. 10–12) including an array of transistors 27. Typically, the transistor 23 may be an NPN photosensitive transistor sold by Motorola under the designation MRD-300 or MRD-200 or an NPN transistor sold by General Electric under the designation LI 4A502. The transistor 23 has an emitter $e$, a collector $c$, and a base $b$.

The apparatus shown also includes a source of periodic potential of variable frequency, specifically a pulse generator 31 whose pulses are of short duration compated to the duration of the pause intervals between pulses. In FIG. 3 the pulse generator 31 is represented by the voltage source 33 combined with the switch 35 which may be regarded as closing and opening at the pulsing frequency. In actual practice, the variable frequency pulse generator 31 is an electronic component whose switch 35 may be solid state element capable of opening and closing at a frequency which may be varied over a wide range in excess of one to 10,000.

The sensing element 21 is pulsed from the pulse generator 31 which is of variable frequency. Specifically, the emitter-collector circuit of the transistor 23, as shown in FIG. 3, is connected in circuit with the generator and is pulsed. Typically, the sensing element measures light intensity and is subjected to radiation from a source 41 which varies the current flow through the sensing element during the pulses.

The operation is illustrated in FIGS. 3 and 4. In FIG. 3 the emitter-collector circuit of the transistor 23 is connected to ground through an ammeter 43 which measures the current that flows during the pulses and a load 45 represented as a resistance. A voltmeter 47 is connected across the load 45.

The equivalent circuit is shown in FIG. 4. The effect of the pulsing signal is represented by generators 49 between the collector $c$, emitter $e$ through the load resistance 45. The junctions between the base $b$ and the collector $c$ and emitter $e$, respectively, are essentially diodes 53 and 55, permitting positive current flow in the direction of the arrows. There is substantial capacity between the collector $c$ and the base $b$ represented by capacitance 57; the capacity, represented by capacitance 59, between the base $b$ and emitter $e$, is substantially smaller. (See FIGS. 6 and 7.) The thermal leakage between the collector $c$ and base $b$ and emitter $e$ and base $b$ is represented by current generators 61 and 63.

FIGS. 5a, 5b and 5c show the manner in which the circuit shown in FIG. 3 responds to the pulses. In each graph time is plotted horizontally and points on the time axes along a common vertical line represents the same instants of time. Graph a shows the pulses impressed by the generator 31 as a function of time; voltage is plotted vertically. Such pulses may be regarded as produced by the generator 49 by the closing and reopening of switch 35. Capacitor 57 (FIG. 4) is charged by a current pulse as shown in FIG. 5b where current is plotted as a function of time. The resulting voltage produced across capacitor 57 is shown as a function of time in FIG. 5c.

The rectangles shown in FIG. 5a in light full lines represent impressed pulses of a given frequency. The corresponding current pulses are shown in light full lines in FIG. 5b. As shown by the light full line curve in FIG. 5c, the capacitor 57 is charged to a maximum voltage during the impressed pulses, while switch 35 is closed, and then switch 35 is open, discharges continuously through the leakage 61 (FIG. 4), as represented by the light full-line curve, until the next pulse is impressed by generator 49 (next closing of switch 35). The magnitude of the resulting current pulse depends on the extent to which the capacitor 57 is discharged when the corresponding voltage pulse is impressed. Typical pulses are shown in light full lines in FIG. 5b. As each voltage pulse is impressed by generator 49, when switch 35 is reclosed, the capacitor 57 is recharged to its maximum potential and starts discharging again as shown by the light full-line curves.

The current pulse which flows on each reclosure of switch 35 is a current pulse flow that is a measure of the amount of charge that has been removed for the capacitor during the period since the switch was opened. The shape of this pulse is a function of the following:

a. the resistance of the external circuit,
b. the equivalent series resistance of the transistor 23,
c. the capacitance 57 of the base collector junction (which can be augmented by an external capacitor is [not shown] is desired),
d. the amplitude of the charging voltage.
e. the amount of charge removed between pulses.

The rate of discharge of the capacitor 57 is determined by the number of photons per unit area impinging on the transistor 23 and by the temperature of the transistor. To a first approximation the rate of discharge varies with the intensity of the light, that is, with the number of photons incident on the transistor 23 per unit area. The rate of thermal discharge through generator 61 approximately doubles for about 8° to 10°C rise in temperature.

With a lower number of photons per unit area in the transistor 23, the capacitor 57 discharges at a lower rate. Typically, the dicharge may be represented by the light broken line curve of FIG. 5c. The corresponding current pulses following the first pulse are of lower amplitude and area than the pulses produced with the higher number of photons per unit area and are represented by the light broken line pulses of FIG. 5b.

In accordance with this invention the frequency of the generator 31 is controlled so as to maintain either the sensing elements output pulse height or output pulse area constant. For this purpose, a comparator 71 is provided. Typically, the comparator 71 compares the amplitude of the pulses derived from resistor 45 with a reference voltage derived from a potentiometer 73, producing error signal which sets a signal conditioner 75 to supply a control signal to control the repetition rate of a variable frequency oscillator 77; specifically, oscillator 77 may be a voltage-controlled multivibrator. The oscillator 77 has an output 79 which controls the frequency of the generator 31. The generator 31 is reset to a new frequency (with reference to FIGS. 5a, 5b, 5c, a lower frequency) so that the current pulses are returned to their original amplitude. The impressed pulses at the new frequency are shown as heavy broken line pulses in FIG. 5a. The capacitor 57 now discharges for a longer time as shown by the heavy broken-line curves of FIG. 5c, and the current pulses are now raised to the original amplitudes as shown by the heavy broken-line curves of FIG. 5b.

A measure of the light intensity of source 41 is derived from another output 81 of the oscillator 77. The output at 81 is filtered by filter 83 and provides an output signal on indicator 85. At another output 91, the oscillator 77 may provide a digital output through a counter 93. The counter 93 is cycled at a predetermined rate, and the output 91 determines the number of counts produced at any setting of the oscillator. Each pulse of the generator 77 triggers the counter 93 (through 91) and the counter produces a number of counts and then is reset (counter 93 passes through one cycle for each triggering pulse). The frequency of the pulse generator 31, which is in effect derived from oscillator 77, enables the monitoring of the light level of source 41 and is to be preferred to monitoring by measurement of voltage or current because a wide range of frequency is more readily mechanized than a wide range of voltage or current.

To determine temperature, the sensing element 21 may be masked or subject to constant radiation from a source 41 and connected thermally to the region whose temperature is to be measured.

At times, the oscillator 77 of the apparatus shown in FIG. 1 must operate at a relatively low frequency, as low as 1 cycle per second. The reason for this is that the sensing element 21 must integrate the photons received during the pause interval between pulses and the integration time sets the frequency by the pulse, so that in some cases this frequency is low In such situations, a frequency divider 101 may be interposed between the variable frequency oscillator 77 and the pulse generator 31, as shown in FIG. 2, and the oscillator 77 operated at a high frequency while the pulse generator 31 is operated at a low frequency. Typically, the frequency divider 101 may comprise two monolithic 100 bit shift registers which are of relatively small dimensions. Such a frequency divider would permit shifting the output frequency of oscillator 77 upward by a factor of 10,000 to 1.

Where the apparatus shown in FIGS. 1–7 is utilized to measure light level, temperature variations of the sensor 21 could pose a problem. Previous experience would seem to indicate that for well designed photosensing elements 21, the thermal leakage current would be small, and that the thermal effect would not be significant. However, it is possible to introduce temperature compensation at several points in the apparatus. Specifically, the sensor load impedance (load impedance of transistor 23) may be varied, the reference voltage 73 may be varied and the characteristics of the voltage controlled oscillator 77 can be varied. Additionally, (as shown in FIG. 8) a second sensor, masked from the incident light but exposed to the temperature can be used with a differential input comparator to convert temperature effects to a common mode effect which can be readily rejected.

In the apparatus shown in FIG. 8 the sensing element 21 includes a constant temperature chamber 111 in which is disposed a pair of matched transistors 113 and 115. Both transistors 113 and 115 could be provided on the same silicon chip. Each transistor has a collector $c$, an emitter $e$, and a base $b$. Transistor 113 is provided with a mask 117 which prevents incidence of light thereon. The other transistor 115 is subject to the radiation from the source 41. The chamber 111 may have a window 119 permeable to the radiation under observation. For example, if the radiation observed were in the infrared, the window should be composed of rock salt.

The transistors 113 and 115 are connected in open base configurations, and their emitter-collector circuits are connected to be pulsed in common (in parallel) from generator 31. The outputs of the transistor are supplied to a differential pulse comparator 121 which is connected to control the frequency of the generator 31 as disclosed with refrence to FIG. 1. The differential comparator 121 is adjusted for zero output with zero light input from the source 41. Since the thermal signals are matched, temperature changes in the sensing devices 21 as the temperature in the device changes are counteracted. When light falls on transistor 115, the output of comparator 121 is unbalanced and an error signal is generated which causes the frequency of a variable frequency oscillator 77 (not shown in FIG. 8) to change to rebalance the circuit. The new variable frequency oscillator frequency is a measure of the light intensity or level of source 41.

For temperature sensing, both transistors 113 and 115 can be masked (or subject to the same light intensity) while one transistor 115 is subject to the temperature to be measured. The comparator 121 may be set so that the error signal is zero when the transistors 113 and 115 are at the same temperature (or at a predetermined difference in temperature). Any departure from this condition would produce a change in the frequency of the variable frequency oscillator 77.

The apparatus shown in FIGS. 1 through 8 has application to light metering in both terrestrial and space applications with a dynamic range of over 5 to 6 orders of magnitude and to a wide range of temperature sensing applications.

In the light sensing mode, the sensors 21 can be constructed as in-line arrays of up to at least 200 elements, permitting application at an imaging system with mechanical scan in one direction. Readout in frequency or digitally permits simplified automatic signal processing for deep space applications.

FIGS. 9 through 12 disclose such apparatus for reproducing electrically an optical image by scanning. This apparatus includes the monolithic element 25 having a linear array of transistors 27 disposed thereon. The image is projected by scanning along the array 27 of transistors by projection unit 131. The scanning beam may be modulated in accordance with the image to be converted.

The element 25 includes a substrate 133 which may be composed of silicon doped with a P-type element. On the substrate 133 there is an N-type layer 135. Embedded in the N-type layer 135 is a rectangular strip 137 of P-type material. On these strips 137 are diffused the transitors, each including N-type square 139, the collector, within each of which there is a P-type square 141, the base, within each of which there is an N-type square or point 143 the emitter. Connecting leads 145 and 147 are provided to each collector 139 and each emitter 143.

Each transistor is connected in a circuit 151 (FIG. 12) as shown in FIGS. 1 or 2 for producing frequency signals or counts dependent on the light intensity of the light impinging on the transistor. Each circuit includes a variable-frequency pulse generator 153 connected to concuctor 145 for pulsing the associated transistor. Each pulse generator is part of a circuit 151 as shown in FIGS. 1 or 2 when an image is projected on the element 27 the output frequencies of the various circuits 151 depend on the intensity of the radiation impinging on the associated transistor. The optical image is thus converted into a frequency image.

The photosensor could also be fabricated as a small order array consisting of perhaps four elements (not shown) arranged in a square such that the outputs could be used to generate steering commands over a widely dyamic range for an optical homing missile; or as an array of perhaps 30 × 30 elements for crude imaging applications.

Summarizing, the following facilities are provided in accordance with this invention:

1. A wide dynamic range light sensing system utilizing a light integration silicon phototransistor in conjunction with a servo-controlled variable-frequency oscillator and collateral circuits to provide either a frequency or digital type readout capability.

2. A wide dynamic range temperature sensing system utilizing a transistor operated in a pulsed mode with a servo-controlled variable-frequency oscillator and collateral circuitry which achieves increased sensitivity over a direct leakage current measuring technique by virtue of an integrating phenomena.

3. Digital or frequency readout line scanning imaging systems utilizing light integration to provide extremely wide dynamic-range imaging capability.

4. Digital or frequency readout small order mosaic imaging systems utilizing light integration to provide two dimensional imaging capability. In this case a monolithic element including a two-dimensional array of transistors is used.

While certain embodiments of this invention have been disclosed herein, many modifications thereof are feasible. This invention is not to be restricted except insofar as is necessitated by the spirit of the prior art.

What is claimed is:

1. Condition measuring apparatus including at least one transistor having an emitter, a collector and a base, means for subjecting said transistor to said condition, means connected to said emitter and collector for impressing in circuit with said emitter and collector, a periodic electrical potential, means responsive to the magnitude of the current transmitted by said collector and emitter as a result of said potential, while said transistor is subject to said condition, for varying the periodicity of said potential, and means for deriving a measurement of said condition from said varied periodicity.

2. The apparatus of claim 1, wherein the transistor has a collector-base equivalent capacity and the periodic potential is composed of pulses of short duration at intervals, the pulse charging said equivalent capacity, the duration of said pulses being short compared to the interval between pulses and the collector-base equivalent capacity being discharged gradually during said intervals.

3. The apparatus of claim 1, wherein the base of the transistor floats electrically.

4. The apparatus of claim 1, wherein the periodic potential is a pulsating potential composed of pulses impressed between the collector and emitter at predetermined intervals, the duration of the pulses being short compared to the duration of the intervals, so that the contribution of the condition to which the transistor is subject during the pulses is negligibly small to the contribution of the said condition during the intervals.

* * * * *